United States Patent
Farago et al.

(10) Patent No.: US 6,785,773 B2
(45) Date of Patent: Aug. 31, 2004

(54) VERIFICATION OF GLOBAL COHERENCE IN A MULTI-NODE NUMA SYSTEM

(75) Inventors: Steven Robert Farago, Austin, TX (US); Liang-Haw Leu, Austin, TX (US); Lawrence Allyn McConville, Austin, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 09/821,078

(22) Filed: Mar. 29, 2001

(65) Prior Publication Data

US 2002/0144185 A1 Oct. 3, 2002

(51) Int. Cl.[7] ................................................ G06F 12/00
(52) U.S. Cl. ........................ 711/141; 711/146; 711/155; 714/37; 714/47; 714/51
(58) Field of Search ................................. 711/141, 146, 711/155; 714/37, 47, 51

(56) References Cited

U.S. PATENT DOCUMENTS

| | | | | |
|---|---|---|---|---|
| 5,996,050 A | * | 11/1999 | Carter et al. | 711/141 |
| 6,021,261 A | * | 2/2000 | Barrett et al. | 714/37 |
| 6,038,651 A | * | 3/2000 | VanHuben et al. | 712/21 |
| 6,324,612 B1 | * | 11/2001 | Chen et al. | 710/306 |
| 6,430,646 B1 | * | 8/2002 | Thusoo et al. | 710/305 |
| 6,658,652 B1 | * | 12/2003 | Alexander et al. | 717/128 |

* cited by examiner

Primary Examiner—T Nguyen
(74) Attorney, Agent, or Firm—Joseph P. Lally; Mark E. McBurney

(57) ABSTRACT

A system and method for verifying cache coherency in a multi-node, NUMA system includes a transaction modification unit configured to receive event traces generated by a simulation tool. The modification unit modifies transactions that are propagated to another node in the NUMA system and thus result in two bus transactions, a home node transaction (HNT) and a foreign node transaction (FNT). More specifically, the modification unit merges a FNT and its corresponding HNT into a single merge transaction (MT) under a prescribed set of merging rules. The MT has properties of the both the FNT and the HNT. The FNT and HNT are deleted from the event trace and replaced by their corresponding MT to create a modified event trace that is suitable for coherency checking by a single system coherency checker.

24 Claims, 4 Drawing Sheets

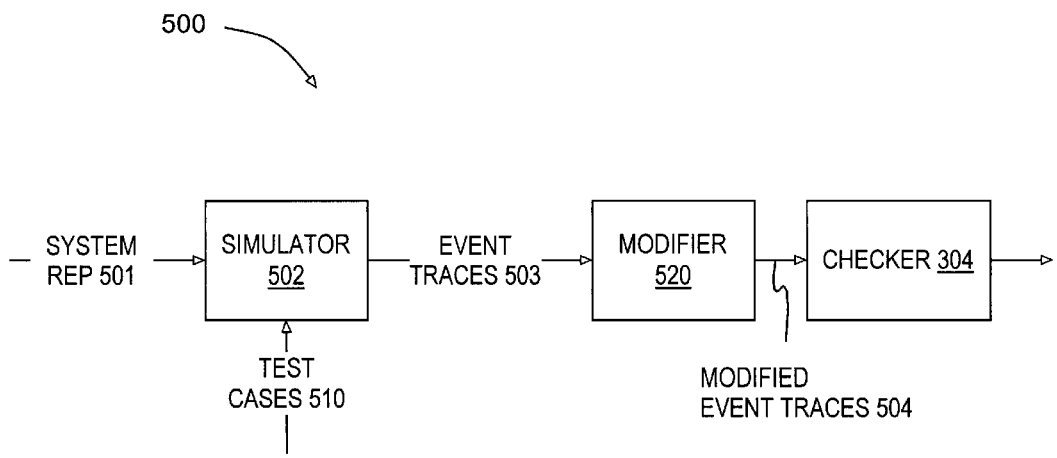

FIG. 5

| CATEGORIES | CONDITIONS | ACTION |
|---|---|---|
| non ownership read transaction | appearing on FN and referenced cache line invalid in all of theFN's local caches | merge FNT and LNT |
| any ownership transaction | appearing on FN and referenced cache line not uniquely owned by one of theFN's local caches | merge FNT and LNT |
| write transaction | appearing on FN | merge FNT and LNT |
| invalidate transactions | related to NUMA protocol | eliminate from event trace |

FIG. 6

VERIFICATION OF GLOBAL COHERENCE IN A MULTI-NODE NUMA SYSTEM

BACKGROUND

1. Field of the Present Invention

The present invention generally relates to the field of data processing systems and more particularly to the design verification of a multi-node NUMA system.

2. History of Related Art

Symmetric Multi-Processing (SMP) architectures are widely used in the design of data processing systems such as computing servers. SMP servers are characterized by multiple processors that communicate with a common system memory across a shared bus. The limited bandwidth of the shared bus constrains the number of processors that can be deployed economically in an SMP machine and suggests the use of alternative technologies for building massively scaleable servers. In addition, standard high-volume, bus-based SMP servers are beginning to appear on the market thereby making it economically attractive to construct larger systems out of multiple standard nodes without fundamentally re-engineering the component machines.

One technology for constructing scaleable server machines is the Cache-Coherent, Non-Uniform Memory (ccNUMA) architecture, in which a special memory controller and a high-speed interconnection switch connect several SMP-based servers, which are referred to as nodes. A processor in this architecture accesses the local memory within its SMP node through its shared memory bus and accesses the remote memory residing on others nodes through the high-speed interconnect. Thus, local memory accesses are faster than remote memory accesses. The special memory controller typically uses a directory structure to ensure that all processors see shared memory accesses in a consistent and coherent manner. The result is a shared-memory architecture that does not have the limitations of a single memory bus, yet maintains the familiar shared-memory programming model.

Although NUMA systems may use SMP systems as a building block, verification of NUMA systems and, more particularly, coherency verification of a NUMA system is not readily accomplished use conventional SMP design verification tools. In a typical SMP design process, a proposed architecture is simulated using a software simulation tool. The simulation tool outputs files, referred to as event traces, which indicate the behavior of a proposed system. The event trace files may then be checked against a predetermined set of system checks to verify the coherency model. An SMP system has multiple processors that share a system memory via a common bus (the system bus). In an SMP system, the system bus provides a point of ordering for all transactions (i.e., the order is established by when the transactions occur on the shared bus) and coherency is enforced using a standard SMP coherency protocol such as MESI. Existing methods of verifying coherency in an SMP system rely on this SMP characteristic. See, e.g., Barrett, Jr., et al., *Method and System for Testing a Multiprocessor Data Processing System*, U.S. Pat. No. 6,021,261 (Feb. 1, 2000).

In a NUMA system, there is no single point of ordering for the entire system. Instead, each node is associated with a range of addresses and the point of ordering for a specific transaction depends upon the range in which the address associated with a specific transaction lies. To account for this additional level of complexity, NUMA systems require a second coherency protocol (NUMA protocol) to enforce coherency across nodes. Unfortunately, existing methods of verifying coherency in an SMP system do not verify that the NUMA protocol is operating correctly and cannot therefore be used directly to verify coherence in a NUMA system. It would therefore be desirable to implement a method and system for verifying the coherence in a NUMA system. It would be further desirable if the implemented solution did not require substantial modification of existing verification software.

SUMMARY OF THE INVENTION

The problems identified above are in large part addressed by a system and method for verifying cache coherency in a multi-node, NUMA system. The system includes a transaction modification unit configured to receive event traces generated by a simulation tool. The transaction modification unit is designed to modify transactions that are propagated to another node in the NUMA system and thus result in two bus transactions, a home node transaction (HNT) and a foreign node transaction (FNT). More specifically, the modification unit merges a FNT and its corresponding HNT into a single merge transaction (MT) under a prescribed set of merging rules. The MT has properties of the both the FNT and the HNT. The FNT and HNT are deleted from the event trace and replaced by their corresponding MT to create a modified event trace that is suitable for coherency checking by a single system coherency checker. The merged transaction may include the event start and source of the originating transaction (the FNT) and the response, response time, and event stop of the resulting transaction (the HNT). The transactions subject to modification include non-ownership read transactions, ownership transactions, and write transactions that reference a memory address located on a different node. Non-ownership, foreign-node read transactions are modified if the corresponding cache line is invalid in all caches on the originating node. Foreign-node ownership transactions are modified if the corresponding cache line is not uniquely owned by a cache on the originating node. Foreign-node write transactions are always modified. In addition, invalidate transactions that are related to the NUMA protocol deleted from the modified event trace.

BRIEF DESCRIPTION OF THE DRAWINGS

Other objects and advantages of the invention will become apparent upon reading the following detailed description and upon reference to the accompanying drawings in which:

FIG. 5 is a conceptualized depiction of a method of verifying coherence in a NUMA system using the coherency checker of FIG. 3;

FIG. 6 is a table identifying the categories of transactions subject to coherence modification, the conditions under which such transactions require modification, and the action taken if the transactions satisfy the specified conditions according to one embodiment of the invention.

Figure 1:
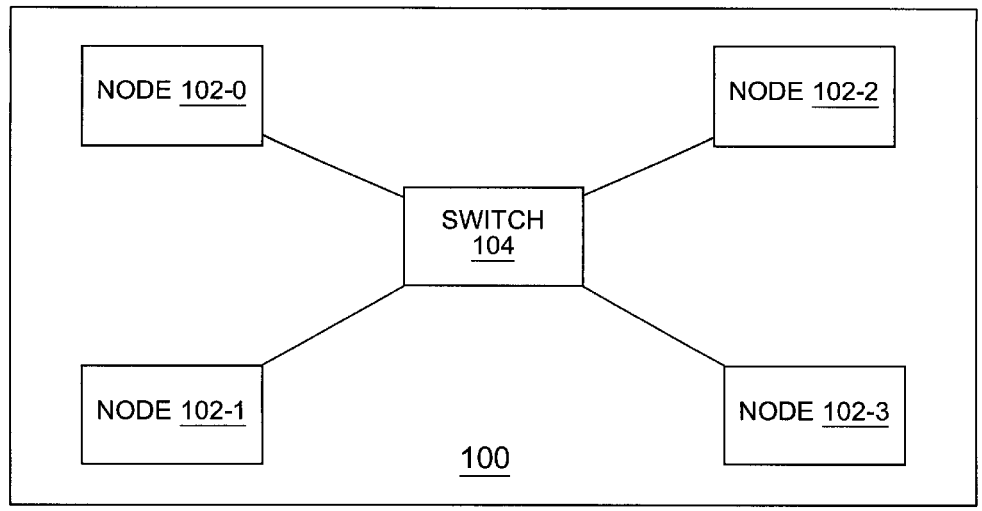
FIG. 1 is block diagram of an embodiment of a NUMA data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Figure 2:
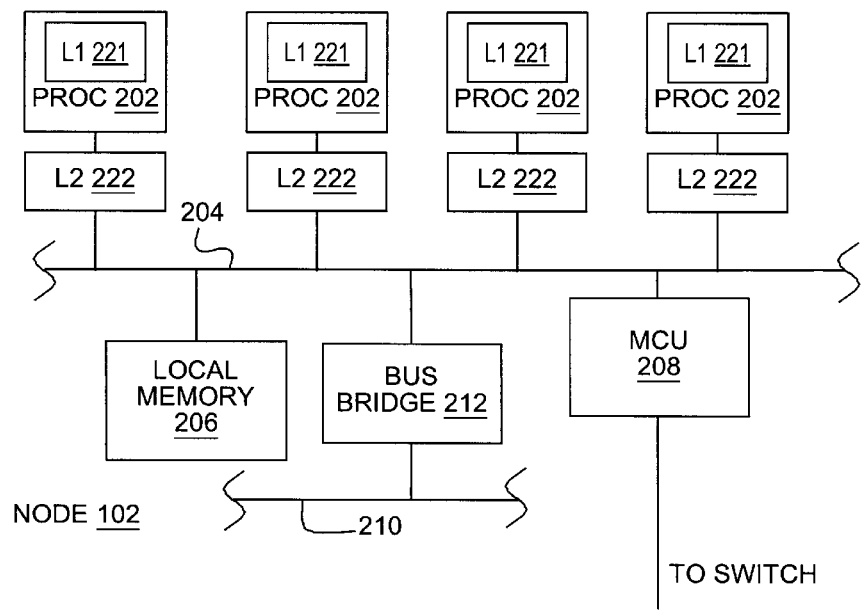
FIG. 2 is a block diagram of an embodiment of a node of the data processing system of FIG. 1.

Turning now to the drawings, FIGS. 1 and 2 illustrate one embodiment of a data processing system 100 suitable for coherency verification using the present invention. In the depicted embodiment system 100 is implemented as a NUMA system that includes a set of nodes 102-0, 102-1, 102-2, and 102-3 (generically or collectively referred to as node(s) 102) that are interconnected via a high-speed switch 104. Each node 102 is typically configured as a symmetric multiprocessor system (SMP) in which two or more microprocessors 202 are connected to a system bus 204. Each microprocessor 202 may include its own internal L1 cache 221 as well as a secondary or L2 cache 222. A memory management unit (MMU) (not depicted) of processor 202 controls the transfer of data between the processor cache(s) and system bus 204. A system memory 206 local to each node 102 is accessible to the processors 202 via system bus 204. Thus, the system memory 206 is substantially equidistant (i.e., equal access time) from each of the processors 202 within a node 102.

Each node 102 of system 100 may include a bus bridge 212 that connects system bus 204 to an IO bus 210 to provide support for any of a variety of IO device adapters (not depicted) including hard disk controllers, graphics adapter, high speed network adapters, and so forth. The IO bus 210 may comply with any of a variety of industry standard peripheral busses including, as examples, the PCI, ISA, EISA, and MCA peripheral busses. The PCI bus is detailed in the PCI Local Bus Specification Rev. 2.2, which is available from the PCI Special Interest Group, Hillsboro, Oreg. (http://www.pcisig.org), and incorporated by reference herein.

In one embodiment, each node 102 includes four processors 202, 1 GB of system memory 206, and a standard set of peripheral devices including keyboard, mouse, hard disk controller, graphics adapter, network adapter, and so forth. A mesh coherence unit (MCU) 208 is connected between system bus 204 and the switch 104. MCU 208 is typically responsible for snooping system bus 204 of node 102 and using a directory-based cache coherence protocol to extend memory coherence across nodes 102. In this arrangement, system 100 is intended to appear to the operating system and application level software as a 16-processor SMP system with 4 GB of system memory. The system memory is mapped such that, for example, system memory address 0-1G refer to the memory of node 102-0, system memory addresses 1G-2G refer to the memory of node 102-1, and so forth.

Figure 3:
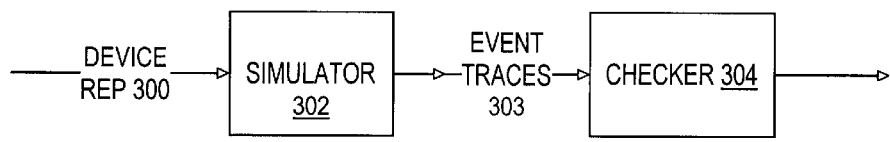
FIG. 3 is a diagram of a method of verifying coherence of a conventional SMP system according to the prior art.

Turning now to FIG. 3, a simplified flow diagram depicting the coherency verification of a conventional SMP system is illustrated. Typically, a representation 300 (such as a VHDL description) of an electronic device or system is generated according to techniques well known in the field of electronic design automation (EDA). The behavior of the device representation 300 is then simulated by providing it as an input to a simulation tool 302 along with a set of test cases, where each test case represents a predetermined sequence of input states. The simulation tool generates one or more of event traces 303 indicating the predicted behavior of the simulated system in response to a given set of inputs. The event traces 303 are then checked against a set of predefined rules, including the SMP coherency rules using a checker 304.

Figure 4:
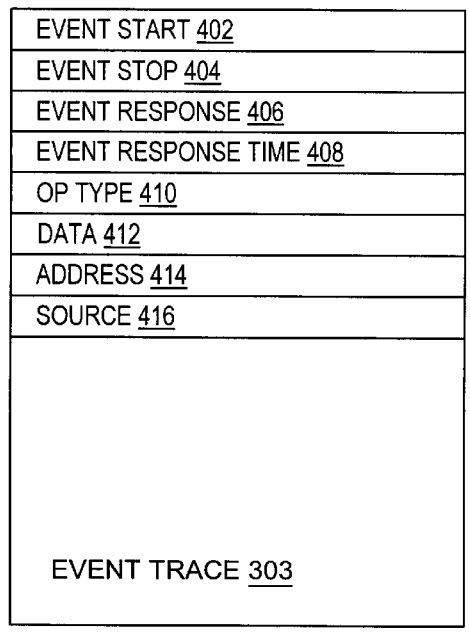
FIG. 4 is a conceptualized representation of an event trace suitable for use in the present invention.

Referring to FIG. 4, each event trace 303 generated by simulation tool 302 typically includes information about the performance of the simulated device. More specifically, each event trace 303 may include various fields of information including an event start field 402 and an event stop field 404 that indicate the start and stop time (typically in terms of CPU cycles). A response field 406, response time field 408, and operation type field 410 provide information about the operation under simulation, the outcome of the operation, and the performance of the system. A data field 412 indicates the data associated with an operation, when appropriate. The address field 414 contains the system address associated with the operation and the source field 416 indicates the origin of the operation. The source may be specified as a combination of the node 102, the processor 202 or bridge 212, and the bus 204 from which an operation originated.

The present invention contemplates modifying the event traces generated by a multi-node NUMA system model in a manner that renders the event traces suitable for verification and checking using a conventional SMP based coherency checker. The modified event traces represent a combined view of activity on all nodes 102. This combined view may be checked by a single system coherency checker for potential global (i.e., inter-node) coherence violations. Preferably, the modification of event traces is achieved using relatively simple and rule-based modifications such that the effort required to modify the event traces is significantly less than the effort that would otherwise be required to modify the SMP coherency checker itself to account for multiple node systems.

Referring now to FIG. 5, a method and system 500 for verifying the cache coherency of a multi-node NUMA systems is depicted. Portions of the invention may be implemented as a sequence of computer executable instructions (software) stored on a computer readable medium of a data processing system that includes a processor capable of accessing the medium, input device(s) such as a keyboard or mouse, and output device(s) such as a display device. The computer readable medium may comprise a hard disk, floppy diskette, CD ROM, DVD, magnetic tape, flash memory card, ROM device, or RAM. System 500 may include a simulator 502 suitable for generating event traces based upon a model 501 of a system such as the multinode NUMA system 100 depicted in FIG. 1. Simulator 502 may be substantially equivalent to the simulator 302 depicted in FIG. 3 that is suitable for generating event traces for a single-node SMP system. Typically, simulator 502 generates event traces based upon system model 501 and one or more test cases 510. Test cases 510 typically represent a sequence of input signals that are applied to system representation 501. To achieve thorough verification coverage for the case in which the simulated system is a multi-node NUMA system, test cases 510 preferably include one or more sequences of events that exercise the inter-node capabilities of the NUMA system. Thus, test cases 510 preferably include load and store instructions originating on a first node that address system memory that is local to a second node. In addition, the inter-node load and store transactions preferably include cases in which the referenced memory address is not found in any of the cache memories local to the originating node.

Simulator 502 generates a set of event traces 503 representing the predicted behavior of the system under test in response to the prescribed test cases 510. In the case of a multi-node NUMA system, the generated event traces include "NUMA events." For purpose of this disclosure, a NUMA event is an event that produces transactions on more than one node 102 of system 100 and, more specifically, an event that produces transactions on more than one system bus 204 (as depicted in FIG. 2). As an example, a transaction originating on node 102-0 (FIG. 1) to a system memory address corresponding to node 102-1 may produce a NUMA event under appropriate circumstances (discussed in greater detail below) related to the type of transaction and the states of the cache memories in system 100. When a NUMA event occurs, the simulated event traces includes at least two transactions. A first transaction, referred to herein as a foreign node transaction (FNT) is the transaction that appears on the system bus 204 of the originating node 102 referencing a memory address local to another node (the target node) where the originating node and the target node are different. When a NUMA event occurs, the FNT is propagated via switch 104 to one or more of the other nodes 102. The second transaction, referred to herein as a home node transaction (HNT), is the transaction appearing on the system bus 204 of the node 102 that is local to the system memory address contained in the originating transaction.

System 500 according to one embodiment of the present invention includes an event trace or transaction modifier 520. Transaction modifier 520 receives the events traces 503 generated by simulator 502 and, in response, produces modified event traces 504. The modified event traces 504 are suitable for providing input to the single system coherency checker 304 that is used to verify cache coherency of a single node, SMP system. By modifying the simulated event traces as described herein, the present invention extends the utility of a coherency checker 304 to encompass multi-node NUMA systems thereby saving significant resources developing a dedicated program for verifying NUMA coherency.

The modification of event traces 503 preferably occurs according to a predetermined set of rules. Transaction modifier 520 is configured to determine if a transaction falls into one of a set of predetermined categories of transactions. Transactions falling into one of the selected categories may potentially invoke the global coherence mechanism of a NUMA system thereby resulting in transactions occurring on multiple system busses. Since the single system coherency checker 304 relies upon a single point of ordering for verifying coherency (e.g., the system bus of an SMP system), the multiple transactions that occur in a multi-node NUMA system are incompatible with the coherency checker's model.

If a transaction falls within one of the predetermined categories, the coherency check then determines whether specified conditions associated with the transaction are true. If the conditions are satisfied, the transaction is identified as a NUMA transaction. Upon identifying a NUMA transaction, transaction modifier 520 identifies at least one corresponding transaction resulting from the NUMA transaction under consideration. As indicated previously, NUMA events result in the creation of a FNT transaction on the originating node and a HNT on the target node(s). Upon identifying a FNT transaction, transaction modifier 520 is configured to identify the FNT's corresponding HNT transaction. When transaction modifier 520 has identified a FNT and located its corresponding HNT transaction, the transaction pair are combined or merged into a single merged transaction (MT) that has properties of both the FNT and the HNT transaction. By replacing multiple transactions with a single merged transaction, transaction modifier 520 creates a single transaction that is consistent with the single point of ordering model assumed by coherency check 304. Thus, the output of transaction modifier 520 is suitable for coherency verification by checker 304.

Referring now to FIG. 6, a table 600 identifying the categories of transactions subject to modification by modifier 520, the conditions under which such transactions require modification, and the action taken if the transactions satisfy the specified conditions according to one embodiment of the invention is presented. In the depicted embodiment, there are three categories of transactions that are subject to modification by transaction modifier 520 and a fourth category of transaction that is subject to deletion by modifier 520. Each of the three categories of transactions subject to modification represent transactions that may potentially propagate across the switch 104 of NUMA system 100 thereby producing a corresponding transaction on a second system bus.

The first category of transactions subject to modification by modifier 520 includes non-ownership read transactions. Non-ownership transactions include transactions that do not give permission to a processor to modify the cache line corresponding to the system memory address of the transaction. A non-ownership read transaction will propagate across switch 104 to another node 102 of NUMA system 100 and thereby produce a secondary transaction only if (1) the transaction references a memory address that is not local to the node from which the transaction originates and (2) there are no valid copies of the corresponding cache line in any cache of the originating node. Thus, if a processor on node 102-1 issues a load command to a memory address belonging to another node that results in a read transaction on the system bus 204 of node 102-1 and there are no valid instances of the corresponding cache line in the caches of node 102-1, the transaction must propagate to the appropriate node so that the requested data may be retrieved. The transaction that appears on the system bus 204 of the originating node (node 102-1 in this case) is referred to as the FNT transaction because it refers to a foreign node system memory address. The transaction that appears on the system bus 204 of the target node is referred to as the HNT because its system memory address is local to the node on which the transaction occurs.

When modifier 520 detects a FNT that is a non-ownership read transaction, the modifier then determines if the transaction resulted in a corresponding HNT. This determination is made by modifier 520 from inspection of the fields in the FNT itself. More specifically, modifier 520 can determine if the FNT required propagation to its home node by inspecting the transaction's event response field 406 (as depicted in FIG. 4). The event response field indicates 406 of a non-ownership read transaction will indicate whether valid copy of the cache line was available on the originating node.

If modifier 520 determines that the FNT was propagated across the switch to its home node, the modifier then locates the HNT that corresponds to the FNT under consideration. Identification of the HNT corresponding to a given FNT is accomplished by matching certain fields of the event traces of both transactions. The address field 414 and data field 412, for example, of the FNT and its corresponding HNT must be an identical match. In addition, the start time field 402 and stop time fields 404 provide additional information in the case that multiple transactions are found with data and address fields that equal the data and address of a given FNT transaction. More specifically, the value in the event start field 402 of the FNT (the originating transaction) must be earlier than the value in the event start field 402 of its corresponding HNT. By comparing the fields of transactions in the event trace with the fields in the originating transaction, transaction modifier 520 can make a highly reliable determination of the HNT that corresponds to a given FNT. Similarly, by inspecting the event response 406 of the originating transaction, modifier 520 can determine when a FNT did not propagate to another node 102 of NUMA system 100. When a FNT transaction does not propagate to another node 102, the modifier 520 leaves the FNT intact and proceeds to the next transaction in the event trace.

Figure 7:
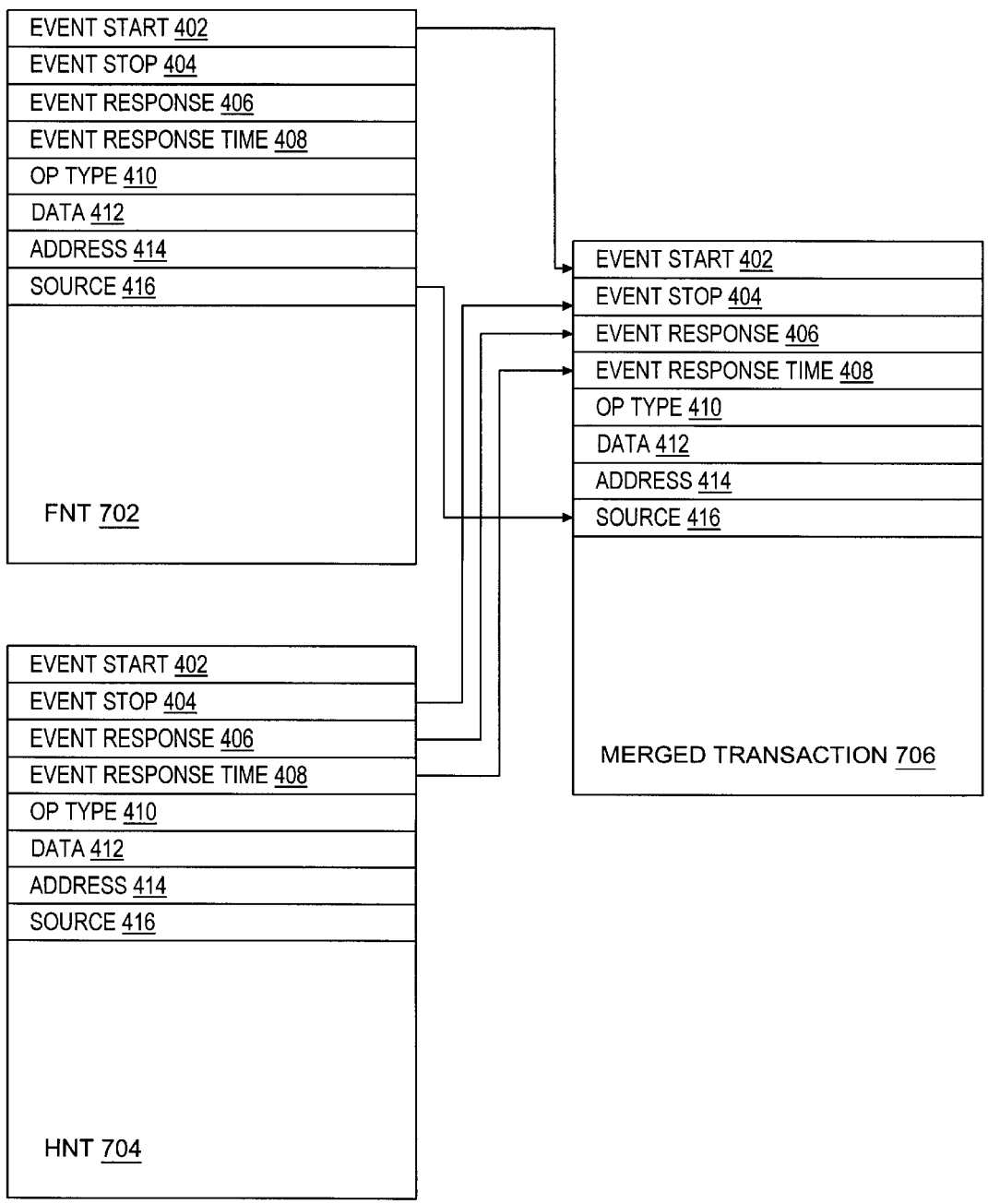
FIG. 7 is a table illustrating prescribed rules for merging transactions in a NUMA system according to one embodiment of the invention.

After modifier 520 identifies the HNT transaction corresponding to a FNT, the modifier 520 generates a merged transaction (MT) according to predetermined rules. In one embodiment, the MT transaction includes values from the originating transaction (FNT) and values from the resulting transaction (the HNT). In one embodiment, the MT takes its event start 402 and source 416 from the FNT and its response time 408, response 406, and event stop 404 from the HNT transaction. The remaining fields, including the op type 410, the data 412, and the address 414, are equal in the same in both the FNT and its corresponding HNT and these values are copied in the MT. This process of merging FNTs and HNTs is depicted graphically in FIG. 7 where an MT 706 is created from a FNT 702 and its corresponding HNT 704 by copying the appropriate fields from the FNT and HNT into the MT. The remaining fields of MT 706 can be copied from either FNT 702 or HNT 704.

Returning now to FIG. 6, a second category of transactions subject to modification by modifier 520 includes any transactions bestowing ownership of the corresponding cache line to the issuing processor. Examples of ownership transactions include read-with-intent-to-modify (RWITM) and DCLAIM transactions. If a FNT is an ownership transaction and the corresponding cache line is not uniquely owned by a cache on the originating node, then the transaction must be propagated to the home node and a HNT transaction generated. If a FNT transaction encountered by modifier 520 satisfies these criteria, the corresponding HNT is located and modified as described previously with respect to non-ownership read transactions.

A third category of transactions subject to modification by modifier 520 includes write transactions. If a FNT is a write transaction, then the transaction must be unconditionally forwarded to the home node to produce a corresponding HNT. Upon detecting a write transaction referencing a foreign address, modifier 520 locates the corresponding HNT and generates an MT as described previously. If a write transaction references a local address (i.e., an address within the memory space of the originating node, the transaction is unaffected.

One embodiment of transaction modifier 520 is further configured to eliminate a fourth category of transactions that include all invalidate transactions such as CMFLUSH, CMCLEAN, and DKILL transactions. If an invalidate transaction is related to the NUMA protocol of the system, it is eliminated from the activity trace by modifed 520. Otherwise, an invalidate transaction is unaffected. An invalidate transaction is said to be related to the NUMA protocol of the system when the transaction is sourced from NUMA switch 104. Generally speaking, invalidate transactions that are specifically related to the NUMA protocol are identifiable by their op type fields 410 and are thus easily eliminated from the modified event trace.

After transaction modifier 520 eliminates the appropriate FNT-HNT pairs from the event trace produced by the simulator 502 and replaces them with corresponding merged transactions as described herein to create a modified event trace 504, the modified event trace is checked for adherence to a prescribed set of cache coherency rules by checker 304 in the conventional manner.

It will be apparent to those skilled in the art having the benefit of this disclosure that the present invention contemplates a system and system method for verifying coherency in a multi-node NUMA system without substantially altering the coherency checking mechanism. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A method of verifying cache coherence in a multi-node data processing system, comprising:

identifying transaction pairs in an activity trace generated by simulating the data processing system, wherein the transaction pairs include: a foreign node transaction (FNT) representing a transaction originating from a processor on a system bus of a first node of the data processing system and referencing a memory location associated with a second node; and, a home node transaction (HNT) representing a transaction resulting from the FNT that occurs on a system bus of the second node;

merging each of the transaction pairs to form a corresponding merged transaction (MT) wherein the merged transaction includes attributes of the FNT and the HNT; and creating a modified activity trace by replacing each of the transaction pairs with its corresponding merged transaction, whereby the modified activity trace is suitable for cache coherence verification by a coherence checker.

2. The method of claim 1, wherein the HNT is sourced by a switch connecting the first node to the second node.

3. The method of claim 1, wherein the merged transaction includes the start-time and source of the FNT.

4. The method of claim 1, wherein the merged transaction includes the end-time of the HNT.

5. The method of claim 1, wherein the FNT comprises a non-ownership read transaction, wherein the cache line referenced by the FNT is invalid in all caches on the first node.

6. The method of claim 1, wherein the FNT comprises an ownership transaction and the cache line referenced by the FNT is not uniquely owned by a cache on the first node.

7. The method of claim 1, wherein the FNT comprises a write transaction.

8. The method of claim 1, wherein the FNT comprises a transaction selected from the group consisting of a non-ownership read transaction wherein the referenced cache line is invalid in all caches of the first node, an ownership transaction wherein the referenced cache line is not uniquely owned by a cache in the first node, and a write transaction.

9. The method of claim 8, wherein the MT start-time and source are equal to the start-time and end time of the FNT and wherein the MT end-time, response, and response-time are equal to the end-time, response, and response-time of the HNT.

10. The method of claim 1, wherein modifying the activity trace further include deleting invalidate transactions in the activity trace that are sourced by a switch connecting the first node to the second node.

11. A computer program product residing on a computer readable medium for verifying cache coherence in a multi-node data processing system, comprising:

computer code means for identifying transaction pairs in an activity trace generated by simulating the data processing system, wherein the transaction pairs include: a foreign node transaction (FNT) originating from a processor on a system bus of a first node of the data processing system and referencing a memory location associated with a second node; and, a home node transaction (HNT) representing a transaction resulting from the FNT that occurs on a system bus of the second node;

computer code means for merging each of the transaction pairs to form a corresponding merged transaction (MT) wherein the merged transaction includes attributes of the FNT and the HNT; and computer code means for creating a modified activity trace by replacing each of the transaction pairs with its corresponding merged transaction, whereby the modified activity trace is suitable for cache coherence verification by a coherence checker.

12. The computer program product of claim 11, wherein the HNT is sourced by a switch connecting the first node to the second node.

13. The computer program product of claim 11, wherein the merged transaction includes the start-time and source of the FNT.

14. The computer program product of claim 11, wherein the merged transaction includes the end-time of the HNT.

15. The computer program product of claim 11, wherein the FNT comprises a non-ownership read transaction and the cache line referenced by the FNT is invalid in all caches on the first node.

16. The computer program product of claim 11, wherein the FNT comprises an ownership transaction and the cache line referenced by the FNT is not uniquely owned by a cache on the first node.

17. The computer program product of claim 11, wherein the FNT comprises a write transaction.

18. The computer program product of claim 11, wherein the FNT comprises a transaction selected from the group consisting of a non-ownership read transaction wherein the referenced cache line is invalid in all caches of the first node, an ownership transaction wherein the referenced cache line is not uniquely owned by a cache in the first node, and a write transaction.

19. The computer program product of claim 18, wherein the MT start-time and source are equal to the start-time and end time of the FNT and wherein the MT end-time, response, and response-time are equal to the end-time, response, and response-time of the HNT.

20. The computer program product of claim 11, wherein the code means for modifying the activity trace further include code means for deleting invalidate transactions in the activity trace that are sourced by a switch connecting the first node to the second node.

21. A data processing system comprising a processor, a computer readable medium, input means, and output means, wherein the computer readable medium is configured with computer instructions for preparing an activity trace of a multi-node data processing system for a cache coherence checker, the computer instructions comprising:

computer code means for identifying transaction pairs in the activity trace, wherein the transaction pairs include: a foreign node transaction (FNT) originating from a processor on a system bus of a first node of the data processing system and referencing a memory location associated with a second node; and, a home node transaction (HNT) representing a transaction resulting from the FNT that occurs on a system bus of the second node;

computer code means for merging each of the transaction pairs to form a corresponding merged transaction (MT) wherein the merged transaction includes attributes of the FNT and the HNT; and computer code means for creating a modified activity trace by replacing each of the transaction pairs with its corresponding merged transaction, whereby the modified activity trace is suitable for cache coherence verification by a coherence checker.

22. The data processing system of claim 21, wherein the FNT comprises a transaction selected from the group consisting of a non-ownership read transaction wherein the referenced cache line is invalid in all caches of the first node, an ownership transaction wherein the referenced cache line is not uniquely owned by a cache in the first node, and a write transaction.

23. The data processing system of claim 22, wherein the MT start-time and source are equal to the start-time and end time of the FNT and wherein the MT end-time, response, and response-time are equal to the end-time, response, and response-time of the HNT.

24. The data processing system of claim 23, wherein the code means for modifying the activity trace further include code means for deleting invalidate transactions in the activity trace that are sourced by a switch connecting the first node to the second node.

* * * * *